US012757040B2

(12) United States Patent
Patro et al.

(10) Patent No.: US 12,757,040 B2
(45) Date of Patent: Oct. 6, 2026

(54) OPTIMAL END-TO-END SLICING IN NEXT-GENERATION NETWORKS WITH MULTI-TIME SCALE APPROACH

(71) Applicant: Tata Consultancy Services Limited, Mumbai (IN)

(72) Inventors: Sumanta Patro, Bhubaneswar (IN); Hemant Kumar Rath, Bhubaneswar (IN); Muralidharan Sadanand Menon, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 219 days.

(21) Appl. No.: 18/902,474

(22) Filed: Sep. 30, 2024

(65) Prior Publication Data

US 2025/0159500 A1 May 15, 2025

(30) Foreign Application Priority Data

Nov. 15, 2023 (IN) ............................ 202321077665

(51) Int. Cl.
*H04W 24/02* (2009.01)
*H04L 41/16* (2022.01)
(Continued)

(52) U.S. Cl.
CPC ............ *H04W 24/02* (2013.01); *H04L 41/16* (2013.01); *H04W 72/566* (2023.01); *H04W 88/085* (2013.01)

(58) Field of Classification Search
CPC . H04W 24/02; H04W 72/566; H04W 88/085; H04L 41/16
See application file for complete search history.

(56) References Cited

U.S. PATENT DOCUMENTS

2022/0022044 A1* 1/2022 D'Oro .................. H04W 48/18
2022/0201601 A1* 6/2022 Cai ...................... H04M 15/66
(Continued)

FOREIGN PATENT DOCUMENTS

CN 114786260 A * 7/2022 ........... H04W 72/56

OTHER PUBLICATIONS

Abdellatif, Alaa Awad et al., "Dynamic Network Slicing and Resource Allocation for 5G-and-Beyond Networks", Title of the item: 2022 IEEE Wireless Communications and Networking Conference (WCNC), Date: Apr. 10-13, 2022, Publisher: IEEE, Link: https://ieeexplore.ieee.org/document/9771877.
(Continued)

*Primary Examiner* — Wesley L Kim
(74) *Attorney, Agent, or Firm* — Finnegan, Henderson, Farabow, Garrett & Dunner LLP

(57) ABSTRACT

State of art techniques proposing end-to-end slice allocation in next-generation networks are focused on network parameters and even if address application parameters, they do so at higher level. A method and system for optimal end-to-end slicing in next-generation networks is disclosed, The method formulates multi objective functions or a combined optimization with multi-time scale approach to address application and network parameters that use different time scales. Using the multi objective functions, the method aims to minimize a penalty matrix that is indicative of difference between a demand matrix of a User Equipment (UE) and an observable matrix that represents UE experience for received slices. The method is practically deployable, real time and has lower complexity.

9 Claims, 7 Drawing Sheets

(51) Int. Cl.
*H04W 72/566* (2023.01)
*H04W 88/08* (2009.01)

(56) References Cited

U.S. PATENT DOCUMENTS

2022/0377751 A1 11/2022 Kotaru et al.
2026/0067699 A1 * 3/2026 Montalvo .............. G06N 20/00

OTHER PUBLICATIONS

Abidi, Mustufa Haider et al., "Optimal 5G network slicing using machine learning and deep learning concepts", Date: Jun. 2021, vol. issue No. vol. 76, Publisher: Science Direct Link: https://www.sciencedirect.com/science/article/abs/pii/S0920548921000131.

* cited by examiner

OPTIMAL END-TO-END SLICING IN NEXT-GENERATION NETWORKS WITH MULTI-TIME SCALE APPROACH

PRIORITY CLAIM

This U.S. patent application claims priority under 35 U.S.C. § 119 to: Indian Patent Application number 202321077665, filed on Nov. 15, 2023. The entire contents of the aforementioned application are incorporated herein by reference.

TECHNICAL FIELD

The embodiments herein generally relate to the field of Next-Generation Networks, and more particularly, to a method and system for optimal end-to-end slicing in next-generation networks by formulating multi objective functions or a combined optimization with multi-time scale approach.

BACKGROUND

Next-generation wireless networks viz., Fifth Generation (5G) mobile networks (5G-New Radio (5G-NR)) pave the way for innovative opportunities for industry verticals with ramifying requirements. The 5G networks are looking forward to satisfying end users' disparate Key Performance Indicator (KPI) requirements. Network slicing is the key facilitator in 5G-NR as it ameliorates data rate and reliability and decreases transmission delay. The 5G-NR aims for an end-to-end (e2e) approach where the physical resources, which include Resource Blocks (RBs) are grouped and partitioned using the virtualization concept. In 5G-NR, operators partition the single physical network into multiple virtual networks called slices. Each slice represents an independent virtualized e2e network. The 5G-NR network slicing is based on Software Defined Networking (SDN) and Network Function Virtualization (NFV), which brings programmability into the network. Further, e2e slicing in 5G-NR enables flexible network operations and deployments. Today, a huge number of vertical industries envision 5G-NR technology as a natural candidate for their deployment. The emergence of prodigious applications viz., smart industries and cities, drone-based deliveries, remote medical treatment, etc., have been witnessed. Since communication procedures associated with these applications are non-identical in terms of latency, throughput, and reliability, each application need not to be provisioned in a similar manner. Keeping this in mind, International Mobile Telecommunications 2020 (IMT-2020) categories all these applications under three broad service categories viz., enhanced Mobile BroadBand (eMBB), massive Machine-Type Communication (mMTC), and ultra-Reliable and Low Latency Communication (uRLLC) as depicted in FIG. 1A. Hence all the applications witnessed today are to be mapped to one of the above three broad service categories. Key Performance Indicators (KPIs) have been defined for the above service categories by Third Generation Partnership Project (3GPP) and 5G Public Private Partnership (5GPPP). To optimize the usage of the resources, KPI limits (representative KPI values are bestowed in Table 1), and appropriate resource allocation schemes have been proposed in literature which basically work on slice identification and slice allocation.

TABLE 1

| | Low | Medium | High |
|---|---|---|---|
| UE data rate (Mbps) | <50 | 50-100 | 100-1000 |
| Latency (ms) | 1-10 | 10-50 | >50 |
| Reliability (%) | <95 | 95-99 | >99 |
| Mobility (km/h) | 0-3 | 3-50 | >50 |
| Availability (%) | <95 | 95-99 | >99 |

As per 3GPP standards, with reference to layered view of end-to-end (e2e) slice allocation mechanism depicted in FIG. 1, the service/application layer defines the KPIs to be adhered to and the Control, Orchestration, and Management (COM) layer translates the KPIs into appropriate control and orchestration commands/policies of the resources available in the Resource Layer through Application Programmable Interfaces (APIs). In other words, applications or business use cases view end-to-end performances at the top of slices. Hence, efficient resource allocation and network slice management need to be addressed effectively.

Attempts have been made to address slice allocation, however, in most of the cases network parameters are used in slice allocation. The application parameters are either not used or loosely used.

SUMMARY

Embodiments of the present disclosure present technological improvements as solutions to one or more of the above-mentioned technical problems recognized by the inventors in conventional systems.

For example, in one embodiment, a method for optimal end-to-end slicing in next-generation networks is provided. The method includes receiving by a Next Generation NodeB (gNB), during a current time frame, a demand matrix generated by each User Equipment (UE) among a plurality of UEs currently served by the gNB deployed by a Mobile Network Operator (MNO), wherein the demand matrix represents a plurality of Key Performance Indicators (KPIs) representing a plurality of application parameters and a plurality of network parameters for each service category among a plurality of service categories associated with an application of the UE.

Further, the method includes determining, by the gNB, priority of each UE based on UE type and the one or more service categories received in the demand matrix. Further, the method includes allocating, by the gNB, number of slices to each UE in accordance with the demand matrix and current resource availability, wherein each UE performs data communication in accordance with the allocated number of slices in a consecutive time frame. Further, the method includes computing by the gNB, for each UE a delta matrix based on a difference between the demand matrix, and an observable matrix capturing actual values of the plurality of KPIs experienced by each UE for the consecutive time frame during data communication in accordance with allocated number of slices and one or more service categories of each UE.

Further, the method includes generating by the gNB, a score matrix representing a UE score of each UE, wherein computing of the UE score comprises normalizing a plurality of elements of the delta matrix by weighing the plurality of elements by associated weight predetermined for a plurality of sensitivity weightage parameters; and determining the UE score for each UE as a weighted sum of the normalized plurality of elements of the demand matrix. Further, the method includes deriving by the gNB, a penalty matrix as function of the score matrix, and a priority matrix generated by arranging the UE priority of each UE.

Furthermore, the method includes determining by the gNB, the number of slices to be allocated to each UE by solving a combined optimization problem comprising multi objective functions or a combined optimization with multi-time scale approach. A first objective function based on the penalty matrix allocates optimal number of slices such that the KPIs are maintained, and a second objective function assigns slices to UEs such that achievable data rate of each UE is maximized falling in different time scales. The multi objective functions are defined in terms of (i) the penalty matrix, and (ii) achievable data rate of each UE over a slice and transmit power of UE over the slice.

Further, the method includes allocating by the gNB, the number of slices to each UE for data communication in a next consecutive time frame, wherein the allocated number of slices are further spilt based on service categories in the demand matrix of each UE, wherein a UE with highest UE score is prioritized for allocation, and wherein the penalty matrix computation and solving of the optimization problem to determine the number of slices repeats for each successive time frame.

In another aspect, a system, also referred to as Next Generation NodeB (gNB), for optimal end-to-end slicing in next-generation networks is provided. The system comprises a memory storing instructions; one or more Input/Output (I/O) interfaces; and one or more hardware processors coupled to the memory via the one or more I/O interfaces, wherein the one or more hardware processors are configured by the instructions to receive, during a current time frame, a demand matrix generated by each User Equipment (UE) among a plurality of UEs currently served by the gNB deployed by a Mobile Network Operator (MNO), wherein the demand matrix represents a plurality of Key Performance Indicators (KPIs) representing a plurality of application parameters and a plurality of network parameters for each service category among a plurality of service categories associated with an application of the UE.

Further, the one or more hardware processors are configured by the instructions to determine priority of each UE based on UE type and the one or more service categories received in the demand matrix. Further, the one or more hardware processors are configured by the instructions to allocate number of slices to each UE in accordance with the demand matrix and current resource availability, wherein each UE performs data communication in accordance with the allocated number of slices in a consecutive time frame.

Further, the one or more hardware processors are configured by the instructions to compute, for each UE, a delta matrix based on a difference between the demand matrix, and an observable matrix capturing actual values of the plurality of KPIs experienced by each UE for the consecutive time frame during data communication in accordance with allocated number of slices and one or more service categories of each UE. Further, the one or more hardware processors are configured by the instructions to compute a score matrix representing a UE score of each UE, wherein computing of the UE score comprises: normalizing a plurality of elements of the delta matrix by weighing the plurality of elements by associated weight predetermined for a plurality of sensitivity weightage parameters; and determining the UE score for each UE as a weighted sum of the normalized plurality of elements of the demand matrix.

Further, the one or more hardware processors are configured by the instructions to derive a penalty matrix as function of the score matrix, and a priority matrix generated by arranging the UE priority of each UE.

Furthermore, the method includes determining by the gNB, the number of slices to be allocated to each UE by solving a combined optimization problem comprising multi objective functions or a combined optimization with multi-time scale approach. A first objective function based on the penalty matrix allocates optimal number of slices such that the KPIs are maintained, and a second objective function assigns slices to UEs such that achievable data rate of each UE is maximized falling in different time scales. The multi objective functions are defined in terms of (i) the penalty matrix, and (ii) achievable data rate of each UE over a slice and transmit power of UE over the slice.

Further, the method includes allocating by the gNB, the number of slices to each UE for data communication in a next consecutive time frame, wherein the allocated number of slices are further spilt based on service categories in the demand matrix of each UE, wherein a UE with highest UE score is prioritized for allocation, and wherein the penalty matrix computation and solving of the optimization problem to determine the number of slices repeats for each successive time frame.

In yet another aspect, there are provided one or more non-transitory machine-readable information storage mediums comprising one or more instructions, which when executed by one or more hardware processors causes a method for optimal end-to-end slicing in next-generation networks. The method includes receiving by a Next Generation NodeB (gNB), during a current time frame, a demand matrix generated by each User Equipment (UE) among a plurality of UEs currently served by the gNB deployed by a Mobile Network Operator (MNO), wherein the demand matrix represents a plurality of Key Performance Indicators (KPIs) representing a plurality of application parameters and a plurality of network parameters for each service category among a plurality of service categories associated with an application of the UE.

Further, the method includes determining, by the gNB, priority of each UE based on UE type and the one or more service categories received in the demand matrix. Further, the method includes allocating, by the gNB, number of slices to each UE in accordance with the demand matrix and current resource availability, wherein each UE performs data communication in accordance with the allocated number of slices in a consecutive time frame.

Further, the method includes computing by the gNB, for each UE a delta matrix based on a difference between the demand matrix, and an observable matrix capturing actual values of the plurality of KPIs experienced by each UE for the consecutive time frame during data communication in accordance with allocated number of slices and one or more service categories of each UE.

Further, the method includes generating by the gNB, a score matrix representing a UE score of each UE, wherein computing of the UE score comprises normalizing a plurality of elements of the delta matrix by weighing the plurality of elements by associated weight predetermined for a plurality of sensitivity weightage parameters; and determining the UE score for each UE as a weighted sum of the normalized plurality of elements of the demand matrix. Further, the method includes deriving by the gNB, a penalty matrix as function of the score matrix, and a priority matrix generated by arranging the UE priority of each UE.

Furthermore, the method includes determining by the gNB, the number of slices to be allocated to each UE by solving a combined optimization problem comprising multi objective functions or a combined optimization with multi-time scale approach. A first objective function based on the penalty matrix allocates optimal number of slices such that the KPIs are maintained, and a second objective function assigns slices to UEs such that achievable data rate of each UE is maximized falling in different time scales. The multi objective functions are defined in terms of (i) the penalty matrix, and (ii) achievable data rate of each UE over a slice and transmit power of UE over the slice.

Further, the method includes allocating by the gNB, the number of slices to each UE for data communication in a next consecutive time frame, wherein the allocated number of slices are further spilt based on service categories in the demand matrix of each UE, wherein a UE with highest UE score is prioritized for allocation, and wherein the penalty matrix computation and solving of the optimization problem to determine the number of slices repeats for each successive time frame.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Figure 1A:
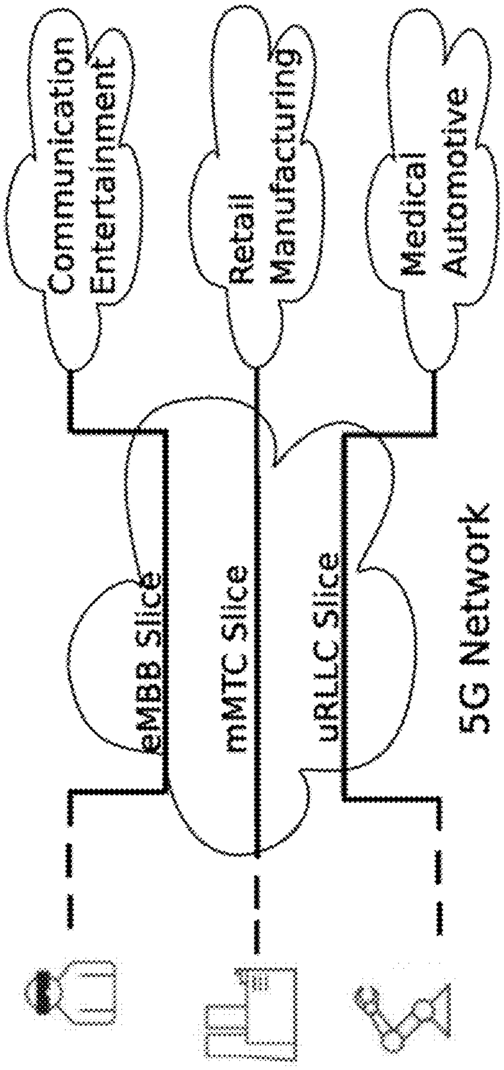
FIG. 1A illustrates slicing in Next-Generation network (e.g., Fifth Generation (5G) mobile network also referred to as 5G-New radio (NR)) based on three broad service categories viz., enhanced Mobile BroadBand (eMBB), massive Machine-Type Communication (mMTC), and ultra-Reliable and Low Latency Communication (uRLLC) in accordance with the 5G Public Private Partnership (5GPPP) or Third Generation Partnership Project (3GPP) standard.

Embodiments of the present disclosure provide a method and system for optimal end-to-end (e2e) slicing in next-generation networks by formulating multi objective functions or a combined optimization with multi-time scale approach implemented in a Next Generation NodeB (gNB). The method disclosed herein provides a Key Performance Indicator (KPI) based model wherein entire network resources are combined together before getting partitioned into a set of infinitely thin slices. These slices are then provisioned as per their service categories, i.e., enhanced Mobile BroadBand (eMBB), massive Machine-Type Communication (mMTC), and ultra-Reliable and Low Latency Communication (uRLLC) as depicted in FIG. 1A. The provisioning is such that the desired KPIs are maintained. The method disclosed enables maintaining a real-time tab on the KPI deviation with maximal efficiency. Thus, the method disclosed herein is implementable in real-time and has low complexity. The method is practically deployable which uses application and network needs. Since application and network use different time scales or granularities, the method utilizes multi objective functions or a combined optimization with multi-time scale approach to ensure application requirements and network availability.

One of the recent work, *Dynamic Network Slicing and Resource Allocation for 5G-and-Beyond Networks* by Alaa Awad Abdellatif et. al., proposes implementing slicing logic or mechanism in a centralized controller such as the Software Defined Networking (SDN) and is focused on network slicing by optimizing the selection of radio points of access and data routing. Further, the SDN controller needs extra signaling which is an overhead to the system. However, embodiments of the method and system disclosed herein do not include any extra signaling and is efficient. The method disclosed, configures the gNB to receive demand from User Equipment (UE), keeps track of history of KPI demand, network characteristics (viz., channel conditions etc.) and number of slices assigned earlier to each UE or application associated with the UE and allocates slices proactively. This brings more efficiency and effectiveness in slice allocation.

Similarly, another work titled *Dynamic 5G network slicing to maximize spectrum utilization proposes a slice controller*, controls operations of the MAC (Medium Access Control) layer functions based on PHY (physical) layer radio resource and requires alteration to protocol stack of 5G Public Private Partnership (5GPPP). However, as mentioned earlier, the method disclosed herein is part of gNB functionality and is outside of the protocol stack and does not require PHY layer activity.

Another work in the art providing optimal slice allocation titled *Slice resource allocation method and device based on 5G network*, allocates slices based on user utility function, that uses the average satisfaction evaluation function and the preset slice priority as constraints. However, the method disclosed herein provides optimal slicing using a multi-time scale approach which allocates optimal number of slices with maximal data rate. The utility function uses an average satisfaction degree evaluation function, whereas method disclosed takes into consideration both network and application parameters during slicing.

Moreover, the slice allocation scheme provided by the method and system (gNB) disclosed herein provides guaranteed KPI and optimal usage of network resources and offers several benefits such as, real-time slice allocation low complexity, easy to develop and hence practically deployable.

Referring now to the drawings, and more particularly to FIGS. 1B through 7, where similar reference characters denote corresponding features consistently throughout the figures, there are shown preferred embodiments and these embodiments are described in the context of the following exemplary system and/or method.

Figure 1B:
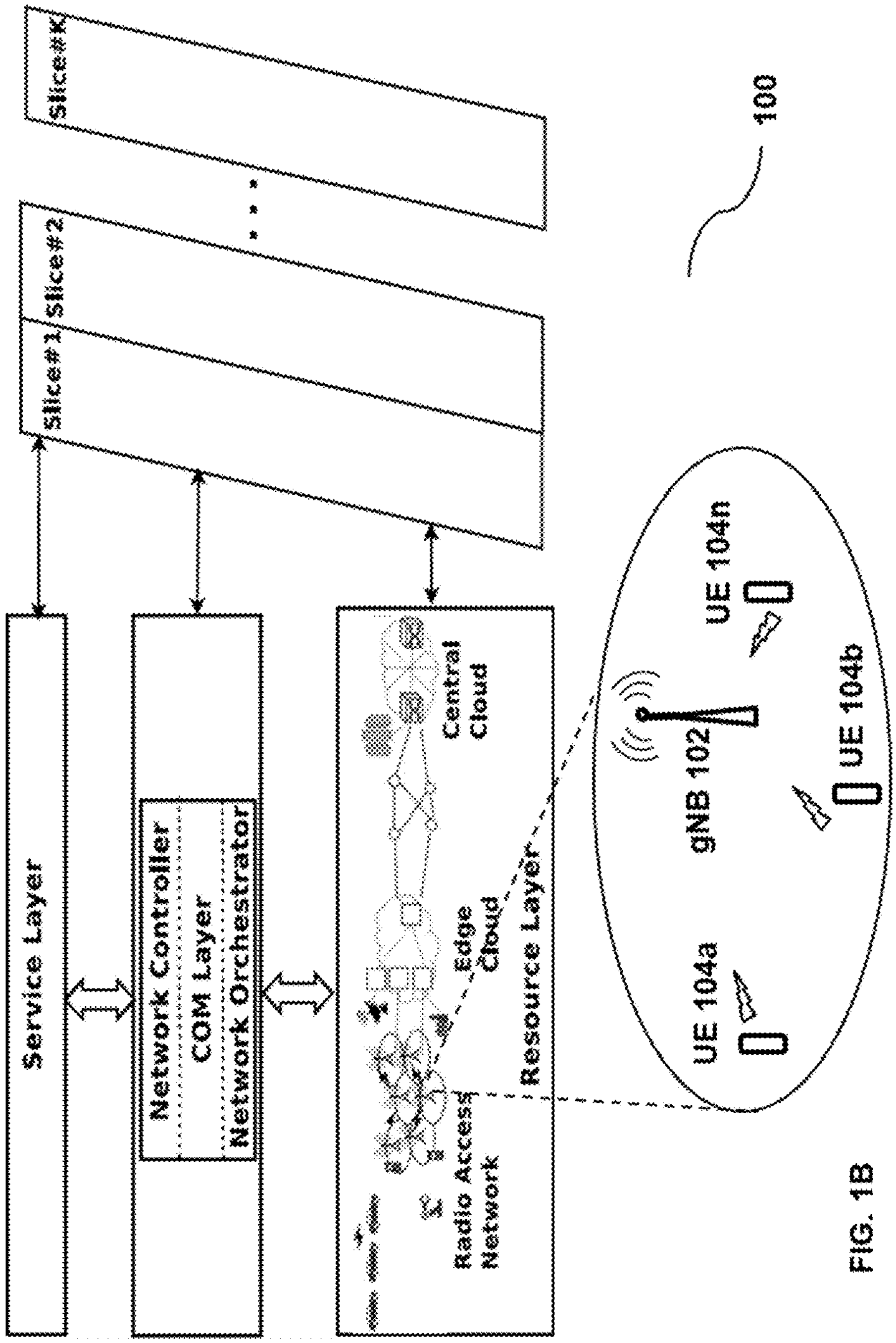
FIG. 1B illustrates an architectural overview of the 5G-NR with a system or in a Next Generation NodeB (gNB) implementing optimal end-to-end slicing by formulating multi objective functions or a combined optimization with multi-time scale approach, in accordance with some embodiments of the present disclosure.

FIG. 1B illustrates an architectural overview of the 5G-NR with a system or in a Next Generation NodeB (gNB) implementing optimal end-to-end (e2e) slicing by formulating multi objective functions or a combined optimization with multi-time scale approach, in accordance with some embodiments of the present disclosure. As per 5G standards, FIG. 1B depicts a layered view of e2e slice allocation mechanism. The service/application layer defines the KPIs to be adhered to and the Control, Orchestration, and Management (COM) layer translates the KPIs into appropriate control and orchestration commands/policies of the resources available in the Resource Layer through Application Programmable Interfaces (APIs). In other words, applications or business use cases view end-to-end performances at the top of slices.

To cater to the applications' need, Mobile Network Operators (MNOs) need to provide appropriate resources. This can be performed by the intermediary COM layer of FIG. 1B, which manages both the Virtual Network Functions (VNFs) and Physical Network Functions (PNFs). Though multiple access networks are possible to be used and MNOs can collaborate to cater to the need of UEs, for ease of explanation and understanding a single MNO with 5G-NR as access network technology is considered herein. Further, considered here is a simple single Radio Access Technology (RAT) solution where the Over-The-Top (OTT) applications are hosted on the cloud, keeping appropriate agents deployed in the UEs 104*a-n*.

A single cell scenario with multiple UEs 104*a-n* ($UE_i$; $\forall i=1:N$) and a single base station or gNB 102 is considered. FIG. 1B also depicts an enlarged view of one among a plurality of gNBs, in a Radio Access Network (RAN) of a resource layer in the 5GPPP architecture. The enlarged gNB cell depicts a plurality of UEs (UE 104*a* through UE 104*n*) currently served by the gNB 102 deployed by a Mobile Network Operator (MNO). Each UE runs multiple applications which send traffic belonging to eMBB (e), mMTC (m), and uRLLC (u). Each application is further associated with a set of KPIs. For simplicity, considered here for example are few KPIs such as, data rate, latency, and Bit Error Rate (BER).

The system or the gNB 102 is configured to create 'K' number of infinitely thin slices ($S_k$; $\forall k=1:K$) which are mapped with physical and virtual set of resources. For example, in 5G-New Radio (5G-NR), Resource Blocks (RBs) and in the case of Wi-Fi, slots are considered as physical resources. The virtual resources include Virtual Machines (VMs), Virtual Network Functions (VNFs), and other related functionalities as required. In the method disclosed herein, each UE sends a set of KPI requests to the gNB for each type of traffic type associated with it. Based on the demand and resource availability, gNB allocates resources or slices to UEs keeping their traffic types in mind.

Figure 2:
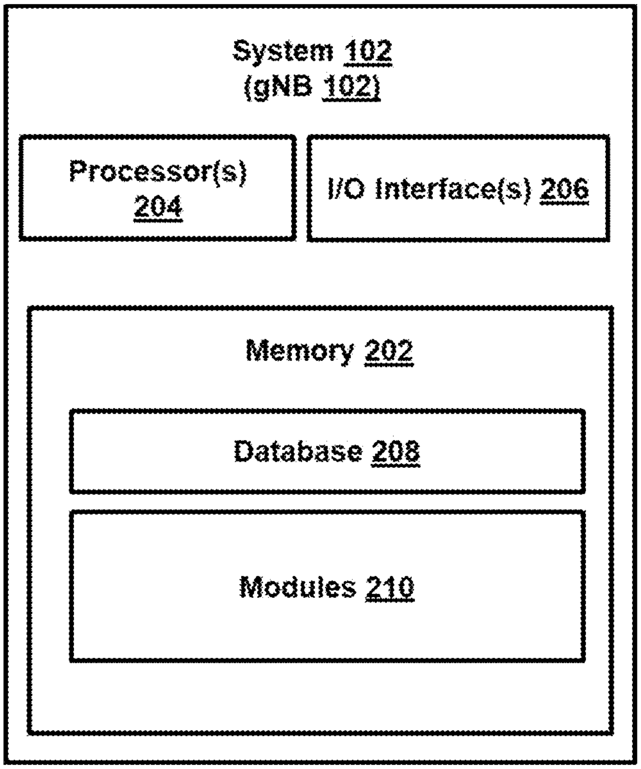
FIG. 2 is a functional block diagram of the system or the gNB of FIG. 1B for optimal end-to-end slicing using multi objective functions or a combined optimization with multi-time scale approach, in accordance with some embodiments of the present disclosure.

FIG. 2 is a functional block diagram of the gNB 102, interchangeably referred to as system 102, of FIG. 1B for optimal end-to-end slicing using multi objective functions or a combined optimization with multi-time scale approach, in accordance with some embodiments of the present disclosure.

In an embodiment, the system 102 includes a processor(s) 204, communication interface device(s), alternatively referred as input/output (I/O) interface(s) 206, and one or more data storage devices or a memory 202 operatively coupled to the processor(s) 204. The system 102 with one or more hardware processors is configured to execute functions of one or more functional blocks of the system 102.

Referring to the components of system 102, in an embodiment, the processor(s) 204, can be one or more hardware processors 204. In an embodiment, the one or more hardware processors 204 can be implemented as one or more microprocessors, microcomputers, microcontrollers, digital signal processors, central processing units, state machines, logic circuitries, and/or any devices that manipulate signals based on operational instructions. Among other capabilities, the one or more hardware processors 204 are configured to fetch and execute computer-readable instructions stored in the memory 202. In an embodiment, the system 102 can be implemented in a variety of computing systems including laptop computers, notebooks, hand-held devices such as mobile phones, workstations, mainframe computers, servers, and the like.

The I/O interface(s) 206 can include a variety of software and hardware interfaces, for example, a web interface, a graphical user interface and the like and can facilitate multiple communications within a wide variety of networks (N/W) and protocol types, including wired networks, for example, LAN, cable, etc., and wireless networks, such as WLAN, cellular (next generation/5G network) and the like. In an embodiment, the I/O interface(s) 206 can include one or more ports for connecting to a number of external devices or to another server or devices such as the UEs 104*a* through 104*n*.

The memory 202 may include any computer-readable medium known in the art including, for example, volatile memory, such as Static Random Access Memory (SRAM) and Dynamic Random Access Memory (DRAM), and/or non-volatile memory, such as Read Only Memory (ROM), erasable programmable ROM, flash memories, hard disks, optical disks, and magnetic tapes.

In an embodiment, the memory 202 includes a plurality of modules 210 such as a slicing module and the like. The plurality of modules 210 include programs or coded instructions that supplement applications or functions performed by the system 102 for executing different steps involved in the process of e2e optimal slicing, being performed by the system 102. The plurality of modules 210, amongst other things, can include routines, programs, objects, components, and data structures, which performs particular tasks or implement particular abstract data types. The plurality of modules 210 may also be used as, signal processor(s), node machine(s), logic circuitries, and/or any other device or component that manipulates signals based on operational instructions. Further, the plurality of modules 210 can be used by hardware, by computer-readable instructions executed by the one or more hardware processors 204, or by a combination thereof. The plurality of modules 210 can include various sub-modules (not shown).

Further, the memory 202 may comprise information pertaining to input(s)/output(s) of each step performed by the processor(s) 204 of the system 102 and methods of the present disclosure.

Further, the memory 202 includes a database 208. The database (or repository) 208 may include a plurality of abstracted pieces of code for refinement and data that is processed, received, or generated as a result of the execution of the plurality of modules in the module(s) 210.

Although the data base 208 is shown internally to the system 102, it will be noted that, in alternate embodiments, the database 208 can also be implemented external to the system 102, and communicatively coupled to the system 102. The data contained within such an external database may be periodically updated. For example, new data may be added into the database (not shown in FIG. 2) and/or existing data may be modified and/or non-useful data may be deleted from the database. In one example, the data may be stored in an external system, such as a Lightweight Directory Access Protocol (LDAP) directory and a Relational Database Management System (RDBMS). Functions of the components of the system 102 are now explained with reference to steps in flow diagrams in FIG. 3 with reference to FIGS. 4 to 7.

Figure 3A:
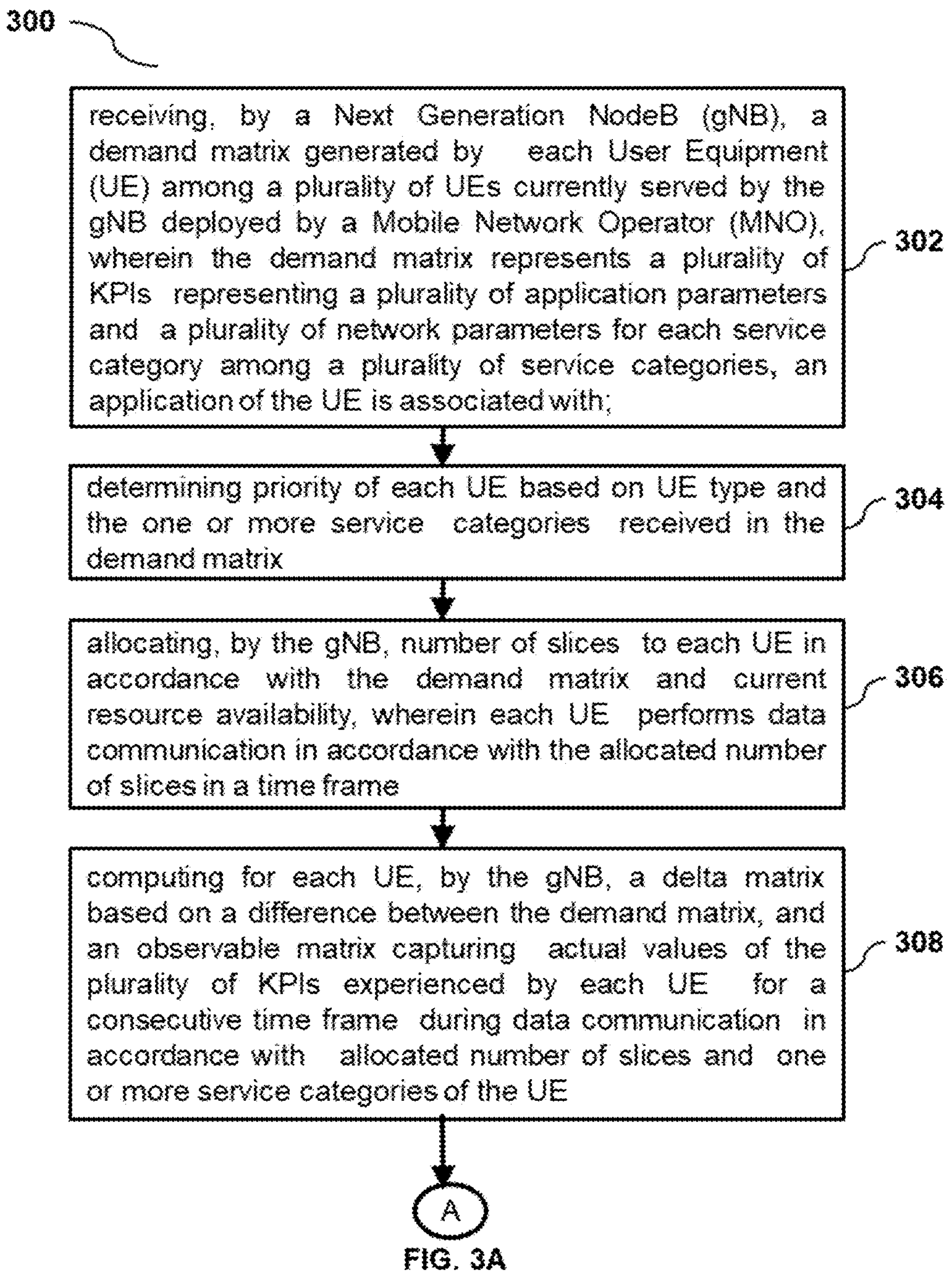
FIGS. 3A through 3B (collectively referred as FIG. 3) is a flow diagram illustrating a method for optimal end-to-end slicing in the gNB of FIG. 2 by formulating multi objective functions or a combined optimization with multi-time scale approach, in accordance with some embodiments of the present disclosure.
Figure 3B:
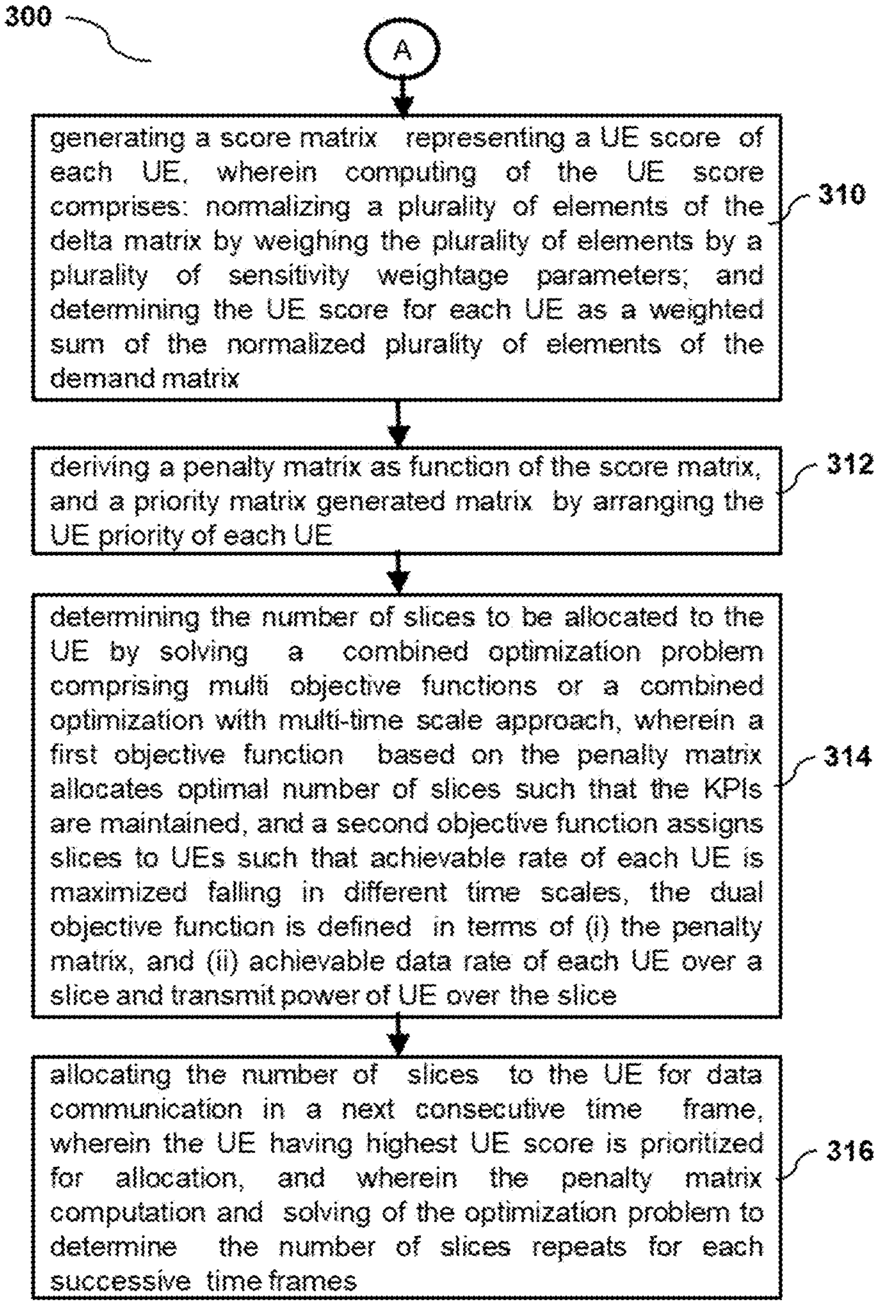

FIGS. 3A through 3B (collectively referred as FIG. 3) is a flow diagram illustrating a method 300 for optimal end-to-end slicing in the gNB 102 of FIG. 2 by formulating multi objective functions or a combined optimization with multi-time scale approach, in accordance with some embodiments of the present disclosure.

In an embodiment, the system 102 or the gNB 102 comprises one or more data storage devices or the memory 202 operatively coupled to the processor(s) 204 and is configured to store instructions for execution of steps of the method 300 by the processor(s) or one or more hardware processors 204. The steps of the method 300 of the present disclosure will now be explained with reference to the components or blocks of the gNB 102 as depicted in FIGS. 1B and 2 and the steps of flow diagram as depicted in FIG. 3. Although process steps, method steps, techniques or the like may be described in a sequential order, such processes, methods, and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Referring to the steps of the method 300, at step 302 of the method 300, the one or more hardware processors 204 of the gNB 102 are configured by the instruction to receive during a current time frame, a demand matrix generated by each UE 104*a* among a plurality of UEs 104*a-n*) currently served by the gNB 102 (as in example scenario of a cell of FIG. 1B). The demand matrix provides a structured representation to communicate to the gNB 102 a plurality of KPIs representing a plurality of application parameters and a plurality of network parameters for each service type among a plurality of service types associated with an application of the UE. Thus, the UE 104*a* is configured to represent all future expected KPIs associated with demand requirement or for the amount of data to be transmitted by the UE for the associated applications through the gNB for a next time frame in a single matrix as a combination of network and application KPIs.

The UEs (104*a-n*) intend to send their data without any KPI violation, and the MNO is interested in ensuring that the KPI requests of all UEs 104*a-n* are satisfied and at the same time, resource utilization is maximized. For a single MNO, let the KPI values (maximum 'n' in number, where n≥1) of the UEs which are necessary to be maintained by the MNO, as proposed by 5GPPP, be represented by an achievable or demand matrix $A_i(t)$ for $i^{th}$ UE as following:

$$A_i(t) = \begin{bmatrix} e_{1i} & e_{2i} \ldots & e_{ni} \\ m_{1i} & m_{2i} \ldots & m_{ni} \\ u_{1i} & u_{2i} \ldots & u_{ni} \end{bmatrix} \quad (1)$$

In the demand matrix above, e, m, and u are the service categories or service types, and 1, 2, till n are indicate various demanded KPI values of a combination of network and application parameters for application falling into a respective service category, also referred to as service type based on traffic types.

Generating the demand matrix: As per the standard (5GPPP or Third Generation Partnership Project (3GPP)), for each type of applications, the KPIs are defined. In addition to this, the channel condition can be observed by the hardware available with both the UE and the gNB which can be used as network parameter. This enables UE to generate the demand matrix in each time frame.

For example, $i^{th}$ UE ($UE_i$) is running a banking application. Say, in the next couple of frames, it needs to transmit 1 Mega Byte (MB) of data (transaction data). This is called demand. Now to transmit that data, the UE needs max 100 milli seconds (msec) (i.e., the entire 1 MB should be transmitted on or before 100 msec. Further the banking application needs high quality transmission, so the BER should be very good, i.e., say, $10^{(-6)}$, and for each frame the channel condition is (h).

So the demand matrix for that banking application wanting to transfer 1 MB of data has the demand matrix $A_i$=[100, $10^{(-6)}$, h].

This changes in the next frame, as in the next frame, the delay is 90 msec (assuming 10 msec frames) and different channel condition (h1). Above h and h1 indicate different channel conditions.

Thus, the demand matrix enables UE 104*a-n* to communicate dynamic changes in the demand to the gNB 102 for the next time frame, and the gNB 102 dynamically allocates the slices during each time frame.

At step 304 of the method 300, the one or more hardware processors 204 of the gNB 102 are configured by the instruction to determine UE priority of each UE 104*a* based on UE type and service categories (based on traffic types) received in the demand matrix. The UE type, for example, can be predefined based on different billing plans each UE has chosen, such as UE 104*a*-prepaid, UE 104*b*-postpaid, UE 104*n*-corporate plan. Then the UEs' can be arranged based on UE priority into a priority matrix that is predefined for UE type and service category. For example, each application can have another priority level with eMMB-priority1, mMTC-priority2, uRLLC-priority3, etc.

UE type as well as traffic type (service category) also play crucial roles in the allocation process. Priority is elucidated using two levels, first one is categorized based on UE type ($Y_i$) and the second one is based on service categories: $P_{ri_e}$, $P_{ri_m}$, and $P_{ri_u}$.

$$P_{ri} = Y_i P_{ri_l} \quad (2)$$

where l∈{e, m, u}.

At step 306 of the method 300, the one or more hardware processors 204 of the gNB 102 are configured by the instruction to allocate, by the gNB, number of slices to each UE 104*a* in accordance with the demand matrix and current resource availability. The UE 104*a* then performs data communication in accordance with the allocated number of slices in a consecutive time frame.

However, in practice, due to slice allocation and network related issues, UEs experience differently than that of the desired KPIs, which is represented by observable matrix $A'_i(t)$ as following:

$$A'_i(t) = \begin{bmatrix} e'_{1i} & e'_{2i} & \dots & e'_{ni} \\ m'_{1i} & m'_{2i} & \dots & m'_{ni} \\ u'_{1i} & u'_{2i} & \dots & u'_{ni} \end{bmatrix} \quad (3)$$

Therefore, the difference between demand and observable matrix is represented by $D_i(t)$, as following:

$$D_i(t) = sup[A_i(t) - A'_i(t)] \quad (4)$$

where, initially, $A'_i(t)=0$ at t=0 and sup[ ] denotes the supremum of the difference of KPI demanded and observed by the UE i.e., the values of the matrix $D_i(t)$. It is to be noted that the parameters of the above matrix should be as minimum as possible (ideally it should be zero for best experience by any UE). Let the expressions $(e_{1i}-e'_{1i})$, $(m_{1i}-m'_{1i})$, and $(u_{1i}-u'_{1i})$, represented as $\delta_{e1i}$, $\delta_{m1i}$, and $\delta_{u1i}$ respectively, then $D_i(t)$ is denoted as following:

$$D_i(t) = sup\begin{bmatrix} \delta_{e_{1i}} & \delta_{e_{2i}} & \dots & \delta_{e_{ni}} \\ \delta_{m_{1i}} & \delta_{m_{2i}} & \dots & \delta_{m_{ni}} \\ \delta_{u_{1i}} & \delta_{u_{2i}} & \dots & \delta_{u_{ni}} \end{bmatrix} \quad (5)$$

Thus, at step 308 of the method 300, the one or more hardware processors 204 of the gNB 102 are configured by the instruction to compute for each UE 104*a* the delta matrix, as in Eq. (4), based on a difference between the demand matrix, and an observable matrix. The observable matrix Eq. (3) captures actual values of the plurality of KPIs experienced by each UE for the consecutive time frame during data communication in accordance with allocated number of slices and one or more service types of the UE.

The MNO (gNB 102) attempts to minimize the values of $\delta_{eji}$, $\delta_{mji}$, and $\delta_{uji}$, where j={1, 2, 3, . . . , n} in matrix $D_i(t)$ by allocating appropriate slices to UEs. Let $X_i(t)$ be represented as the number of slices assigned to $UE_i$, such that, $$\sum_{i=1}^{N} X_i(t) = K \quad (6)$$

where, 'N' is the total number of UEs.

Let the $S_{ji}$ be denoted as the $j^{th}$ slice assigned to $UE_i$. If a UE has more than one type of service categories i.e., eMMB, mMTC, and uRLLC; then $S_{ji_e}$, $S_{ji_m}$, and $S_{ji_u}$, are the slices assigned corresponding to these service categories/service types.

Herein, when a UE raises a request to gNB for various services, intermediary COM layer probes the characteristics pertaining to application requirements and network resources such as, channel condition, RBs, and slots availability, etc. This makes the method 300 not only application aware, but also network aware in nature.

At step 310 of the method 300, the one or more hardware processors 204 of the gNB 102 are configured by the instruction to generate a score matrix representing a UE score of each UE 104*a*. Steps of computing of the UE score include:

1. Normalize a plurality of elements of the delta matrix by weighing the plurality of elements by associated weight predetermined for a plurality of sensitivity weightage parameters.
2. Determine the UE score for each UE as a weighted sum of the normalized plurality of elements of the demand matrix.

The selection of a candidate (UE) is obtained based on a scoring mechanism which offers the highest profit and fairness to the UEs. The UE, which has the highest score, is assigned first for the service. To compute the score, different weights are assigned related to KPI types (service types). These weights normalize the parameters of the delta matrix (difference matrix). Let the sensitivity weightage parameters be denoted as $\alpha_{ni}$, wherein, $0<\alpha_{ni}\leq 1$. Then, the score $C_i(t)$ can be defined as:

$$C_i(t) = \alpha_{1i}.\delta_{l_{1i}} + \alpha_{2i}.\delta_{l_{2i}} + \dots + \alpha_{ni}.\delta_{l_{ni}} \quad (7)$$

where l∈{e, m, u}.

At step 312 of the method 300, the one or more hardware processors 204 of the gNB 102 are configured by the instruction to derive a penalty matrix as function of the score matrix and the priority matrix generated by arranging the UE priority of each UE.

When a UE receives a set of slices, it maps the slices to service categories. In the process of slice allocation, if the KPIs requested by the UE are not satisfied, then the operator needs to pay a penalty for the violation of KPIs. A penalty is defined as a function of priority and the score (which is again a function of network and application related parameters). Penalty is defined based on UE profile and service categories. Mathematically, penalty matrix '$P_i$' is defined as a function (f(.)), which can be either linear or non-linear function. Herein, it is a non-linear function consisting of priority matrix '$P_{ri}$' and score '$C_i(t)$'.

$$P_i(t) = f(P_{r_i}, \beta C_i(t)) = P_{r_i}.e^{\beta C_i(t)} \quad (8)$$

where β is the scaling factor, a positive number.

When a UE demands KPIs through applications, gNB 102 assigns appropriate slices which may or may not fulfill UE's requested KPIs. If it does not ensure the requested KPIs, it causes a penalty as defined in Eq. (8).

At step 314 of the method 300, the one or more hardware processors 204 of the gNB 102 using the slicing module are configured by the instruction to determine the number of slices to be allocated to the UE 104*a* by solving a combined optimization problem comprising multi objective functions or combined optimization with multi-time scale approach. A first objective function based on the penalty matrix allocates optimal number of slices such that the KPIs are maintained, and a second objective function assigns slices to UEs such that achievable data rate of each UE is maximized falling in different time scales. The multi objective functions or combined optimization is defined in terms of (i) the penalty matrix, and (ii) achievable data rate of each UE over a slice and transmit power of UE over the slice.

Formulation of the optimization problem, which the gNB needs to solve to assign slices to UEs in real-time based on KPI need of the application and network characteristics.

$$O1:\ \min\left[\max_{\forall i}[P_i(t)]\right] \tag{9}$$

$$O2:\ \max\sum_{i=1}^{N}\sum_{j=1}^{K}R_{ij}$$

$$\text{s.t. } C1:\ \sum_{i=1}^{N}\chi_i(t)\le K$$

$$C2:\ p_{ij}\le p_{max}$$

where, $R_{ij}$ is the achievable data rate by $UE_i$ over slice j and $p_{ij}$ refers to transmit power of $UE_i$ over slice j, and $p_{max}$ refers to the maximum transmit power. The optimization problem in Eq. (9) is actually a combination of two contradicting objective functions O1 and O2. In addition to this, O1 and O2 operate in two different time scales. If t1 is the time scale of O1 (for example, t1 depends upon the latency constraint) and t2 is the time scale of O2 (t2 depends upon the physical channel change, i.e., how frequently the wireless channel changes), then t2≤t1. Therefore, Eq. (9) is solved as two different optimization problems. Hence, the first optimization problem can be re-written as:

$$O1:\ \min\left[\max_{\forall i}[P_i(t)]\right] \tag{10}$$

$$\text{s.t. } C1:\ \sum_{i=1}^{N}\chi_i(t)\le K$$

Note that, solution to O1 results in number of slices allocation to $UE_i$; such that KPIs are maintained. While the number of slices per UE to be allocated is important, appropriate mapping of slices to PNFs and VNFs are also important. In other words, in the case of 5G-NR, there should be appropriate slices to RB mapping, and further, slices to UE mapping. While operating so, the vision of COM layer is to maximize the utilization of slices and rate of transmission using those allocated slices. Herein, for example, a linear PNF and VNF mapping with slices is assumed. For an instance, RBs are linearly mapped with the slices such that uniform RBs are mapped to slices. Once the slice to VNF and PNF (RB in example herein) mapping is completed, the slice allocation is considered such that, UEs achieve maximum data rate using those slices. For this, COM layer needs to check the best channel and rate condition (i.e., allocate slice to a UE where the Signal-to-Interference-plus-Noise Ratio (SINR) for allocated RBs is maximum and optimum). This can be obtained by solving the following optimization problem.

$$O2:\ \max\sum_{i=1}^{N}\sum_{j=1}^{K}R_{ij} \tag{11}$$

$$\text{s.t. } C2:\ p_{ij}\le p_{max}$$

It is to be noted that the gNB 102 solves both the optimization problems O1 and O2; O1: Assign number of slices based on the KPIs and other conditions and O2: Assign slice number to UEs based on rate maximization. In other words, while solution of O1 results in KPI satisfaction, solution of O2 results in rate optimization. The solution accuracy of O2 depends on the channel capacity, while solution of O1 depends on the observation of KPIs.

Solution of O1: The score of each UE is used and the following approach is employed as the solution to Eq. (10) to allocate the number of slices to UEs, i.e., $$\chi_i(t)=\left\lfloor\frac{KP_i(t)}{\sum_{i=1}^{N}P_i(t)}\right\rfloor \tag{12}$$

Solution of O2: It is assumed that COM layer of the gNB can predict the rate of transmission of $UE_i$, ∀i at any RB, i.e., at any slice. Therefore, the solution of O2 boils down to rate maximization, i.e., assign slices to UEs such that the achievable data rate over the slices is maximum. Moreover, once the slices are allocated to any $UE_i$, then slices should not be evaluated for allocation till the time $UE_i$ releases those slices.

Since rate maximization is NP-Hard, the method 300 discloses a unique approach for slice management that solves O1 and O2 using heuristic method for slice management.

For scoring mechanism, the KPIs that are considered for network level are the channel condition parameter SINR 'h', and the mean loss rate 'b', and for application level is, the mean e2e delay 'd'. These above KPIs are for an example of $C_i(t)$, i.e., Eq (7). However, any other KPI types and values can be used. This is used for validations herein.

Let $\alpha_{\delta dl}i$, $\alpha_{\delta hl}i$, and $\alpha_{\delta bl}i$ denote the sensitivity weights pertaining to e2e delay, SINR, and BER for $UE_i$ respectively. By using the above, the score $(C_{li})$ of the $UE_i$ is reckoned as following:

$$C_i(t)=\alpha_{\delta d_{l_i}}.\delta d_{l_i}+\alpha_{\delta h_{l_i}}.lg\left[1+\delta h_{l_i}\right]+\alpha_{\delta b_{l_i}}.\delta b_{l_i} \tag{13}$$

For three kinds of service categories, Eq. (13) can be enunciated as following:

$$C_{e_i}(t)=\alpha_{\delta d e_i}.\delta d_{e_i}+\alpha_{\delta h e_i}.lg\left[1+\delta h_{e_i}\right]+\alpha_{\delta b e_i}.\delta b_{e_i} \tag{14}$$

$$C_{m_i}(t)=\alpha_{\delta d_{m_i}}.\delta d_{m_i}+\alpha_{\delta h_{m_i}}.lg\left[1+\delta h_{m_i}\right]+\alpha_{\delta b_{m_i}}.\delta b_{m_i} \tag{15}$$

$$C_{u_i}(t)=\alpha_{\delta d_{u_i}}.\delta d_{u_i}+\alpha_{\delta h_{u_i}}.lg\left[1+\delta h_{u_i}\right]+\alpha_{\delta b_{u_i}}.\delta b_{u_i} \tag{16}$$

In an embodiment, the gNB 102 also uses Machine Learning (ML)/Artificial Intelligence (AI) techniques to obtain the best sensitivity weightage parameters ($\alpha_{\delta dl}i$, $\alpha_{\delta nl}i$, and $\alpha_{\delta bl}i$) related to Eq. (13). Thus, instead of using fixed values, the system 102 can predict and use dynamic values. Any generic ML technique such as, LSTM (Long-Short Term Memory) or the popular ARIMA (AutoRegressive Integrated Moving Average) can be used to predict.

The method 300 provides a simple heuristic method for slice management that solves O1 and O2.

The slice allocation scheme disclosed can be implemented jointly by the gNB and the UEs in practice. Algorithm 1 illustrates the steps to be undertaken by the UEs and the gNB. It is a simple algorithm which can be realized in practice. The slice allocation scheme of method 300 is implemented through simulations and is explained in performance analysis section later.

Fairness Analysis: Further, to understand the fairness of the method 300 for slice allocation, Jain's Fairness Index (JFI) is evaluated as following:

$$\mathcal{J}(X_{ij}) = \frac{\left[\sum_{i=1}^{N} X_{ij}\right]^2}{N\sum_{i=1}^{N} X_{ij}^2} \quad (17)$$

wherein $X_{ij}$ is the number of slices $UE_i$ receives for service j.

Eq. (17) portrays that $\mathcal{J}(X_{ij})$ is continuous in nature and lies in [1/N, 1]. In this period, $\mathcal{J}$=1/N signifies to the least fair slice allocation in which only one UE experiences a non-zero benefit, and $\mathcal{J}$=1 signifies to the fairest slice allocation, wherein all UEs experience the same benefit. Long term fairness and guaranteed KPI values ensure fairness to all UEs.

Algorithm 1: KPI-Based Slice Allocation Technique (Method 300):

1: t ← 0
2: while True do, ∀i
3: $UE_i$ sends demand or the amount of data to be transmitted along with the demand matrix $A_i(t)$ to gNB
4: gNB receives the demand matrix $A_i(t)$, maps the UE type and demand type to appropriate UE priority and KPI matrix respectively
5: gNB computes the observable matrix $A'_i(t)$ ($A'_i(t) = 0$ at t = 0)
6: gNB computes the delta matrix $D_i(t)$ using Eq. (4)
7: gNB computes the score matrix $C_i(t)$ using Eq. (7)
8: Penalty matrix $P_i(t)$ is computed based on the priority matrix $P_{r_i}$ and score matrix $C_i(t)$ using Eq. (8)
9: gNB solves the optimization problem Eq. (9) with multi time scale approach
10: gNB allocates optimal number of slices $X_i(t)$ using Eq. (12) to $UE_i$
11: $UE_i$ receives $X_i(t)$ number of slices
12: t ← t + 1
13: $UE_i$ transmits data using $X_i(t-1)$ number of slices
14: Go to line #3
15: end while At step 316 of the method 300, the one or more hardware processors 204 of the gNB 102 are configured by the instruction to allocate the number of slices to the UE for data communication in a next consecutive time frame that are further spilt based on service types in the demand matrix, by the gNB 102. Thus, once gNB 102 allocates the number of slices to $UE_i(X_i(t))$, it is further split into based on service categories i.e., $S_{jt_e}$, $S_{ji_m}$, and $S_{ji_u}$.

Further, to determine number of slices in accordance with the multi objective functions, the gNB can additionally utilize predictive slice allocation that enables handling delay sensitive slice management. In this predictive approach UE demands are predicted in prior by applying an AI/ML algorithm. Thus, this prediction helps to reserve slices accordingly, and further revise the number of slices for each UE that were computed based on the multi objective functions. The gNB can predict the amount of data to be transmitted by the UE and the KPIs associated with that demand matrix a-priori based on the current and earlier data. For example, if UE is running a Robotic surgery application, then the gNB can predict how much data the UE is going to transmit in the next frame or later. That can help the gNB to plan how many slices should be reserved for that application as it is the highest priority application. Accordingly additional slices can be allocated to the application in addition to those estimated by the Eq. (12) ($X_i(t)$).

Any generic ML algorithms such as Long Short-Term Memory (LSTM) can be used to predict. Even the popular Auto Regressive Integrated Moving Average (ARIMA) can also be used for prediction as the time frame is short here. The gNB keeps track of history of KPI demand, network characteristics (viz., channel conditions etc.) and number of slices assigned earlier to each UE or application associated with the UE. This helps the gNB to predict the slice requirement in the immediate future and assign slices to UEs in such a manner that the resource is maximally utilized and UEs achieve their KPIs. This provides a proactive approach in addition to the real time slice allocation and enhances the performance of the system. The proactive slice reservation is most important for uRLLC applications.

The UE having the highest UE score is prioritized for allocation. The penalty matrix computation and solving of the optimization problem to determine the number of slices repeats for each successive time frames for all UEs (104*a-n*) in accordance with the demand matrix transmitted by the UEs (104*a-n*).

PERFORMANCE EVALUATION: A python-based simulator is developed to conduct extensive simulations. A 5G-NR based Time Division Duplex (TDD) system is developed, which operates in 2.4 Giga Hertz (GHz) spectrum. Further, a single cell 5G-NR based gNB with 100 UEs randomly deployed in the cell is considered as an example scenario. The 100 UEs include low mobile UEs, which move only inside the cell. Out of the 100 UEs, it is assumed that approximately 50% of the UEs as transmitters and the rest as receivers. Three different types of applications related to mMTC, eMBB, and uRLLC service types are running at the UEs' end. Depending on the channel quality, different Modulation and Coding Scheme (MCS) configurations are selected for each UE. The KPI parameters considered are latency, data rate, and reliability. Each scenario is conducted with at least 100 different random seeds over 100 iterations. Table 2 lists the simulation parameters that are considered in the experiments.

TABLE 2

| Simulation Parameters | |
|---|---|
| Parameter | Value |
| 5G-NR Transmission Power | 43 dBm |
| Channel Bandwidth per RB | 1.4 MHz |
| Modulation Schemes | QPSK, [16 64 256]-QAM |
| Carrier Frequency | 2.4 GHz |
| Total Number of UEs | 100 |
| UE Distribution | Random |
| Fading Model | Slow Fading |
| Path Loss Exponent | 3 |
| Number of Sub-frames | 10 |
| Traffic Generation | Random |

Figure 4:
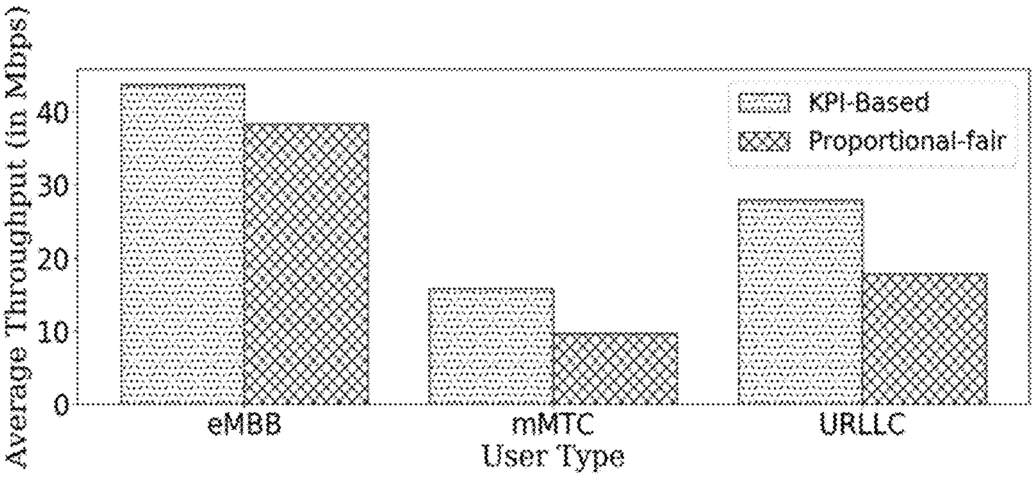
FIGS. 4 through 6 are graphical illustrations of performance of the method based on a plurality of performance parameters, in accordance with some embodiments of the present disclosure.

In practice, resource mapping in e2e slicing is performed at RAN and Core. However, for demonstration purpose herein, RAN slicing through simulation is considered, which is dynamic in nature. A slice allocation scheme as outlined in Algorithm 1 and as disclosed by the method 300 is utilized. Once $X_i(t)$ number of slices are allocated to UEs, they further assign slices based on application priority and $C_i(t)$ values are updated using Eq. (13). The KPI-Based slice allocation technique is compared with that of the popular proportional-fair scheme. FIG. 4 depicts the average throughput of the UEs, wherein the method 300, which is a KPI-Based slice allocation technique outperforms proportional fair algorithm as the method 300 considers KPIs of applications and network availability.

Figure 5:
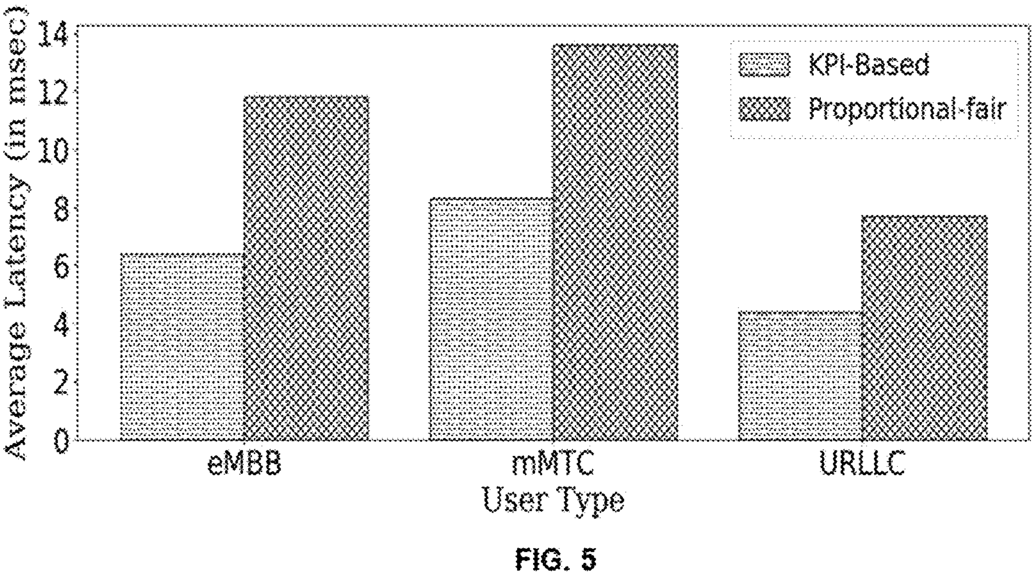
Figure 6:
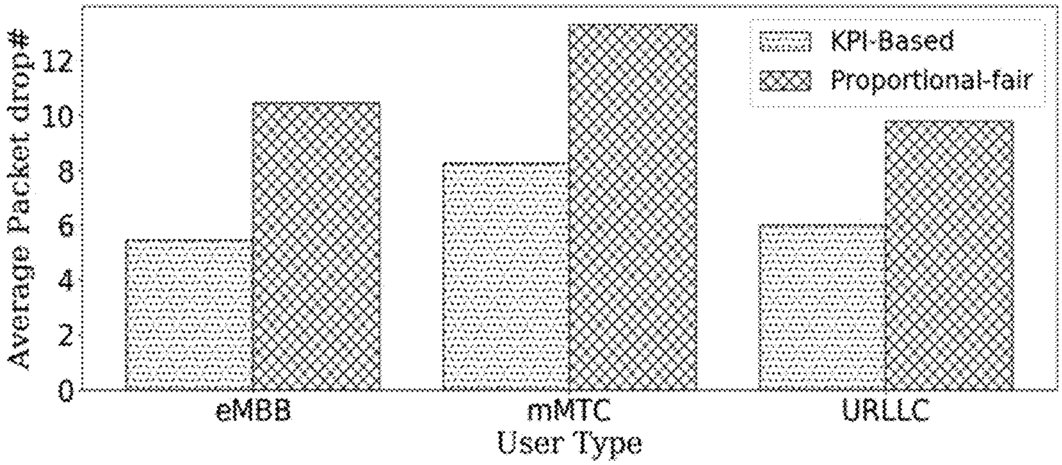
Figure 7:
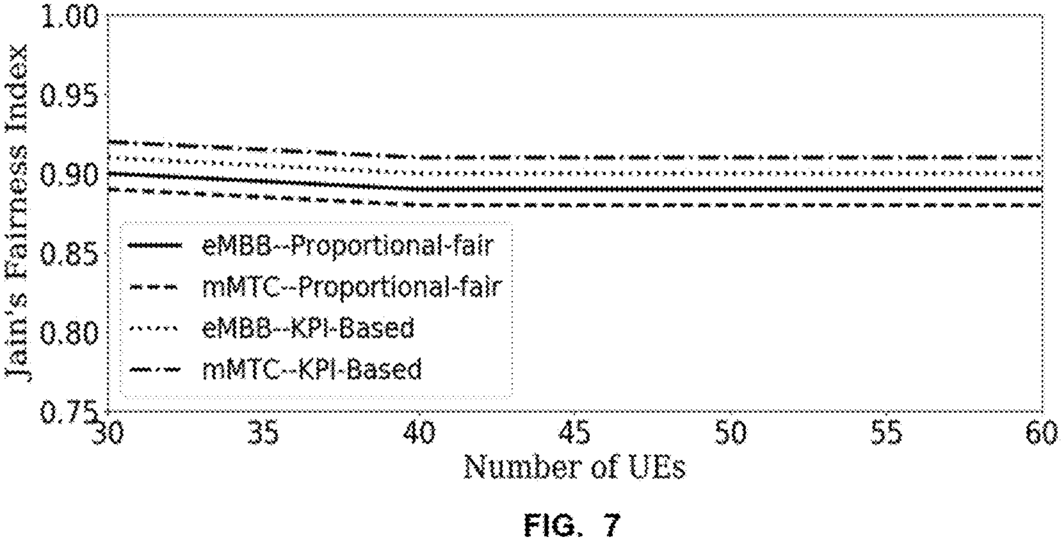
FIG. 7 depicts fairness index of the method towards the UEs in the 5G-NR served by the gNB, in accordance with some embodiments of the present disclosure.

FIG. 5 portrays the average latency of the UEs, wherein the method 300 outstrips proportional-fair algorithm as KPIs are being taken utmost care in the former algorithm. FIG. 6 illustrates the average packet drop count of the UEs, wherein the method 300 outmatches proportional fair algorithm. Note that, KPI-Based slice allocation technique improves resource utilization resulting in improved throughput and lower latency. To understand fairness, Jain's Fairness Index (JFI) is plotted for eMBB and mMTC users only for both proportional fair and the method 300 as in FIG. 7. Since uRLLC is a high priority and extremely low latency application, it should not be evaluated for fairness. From FIG. 7, it is observed that the method 300 (using the KPI-Based slice allocation technique) outperforms the regular proportional-fair scheme. Moreover, JFI obtained as per the method 300 is more than 0.9, i.e., the method 300 not only improves throughput and latency, but it also brings fairness to the 5G-NR slice allocation approach.

Thus, the method and system (gNB) disclosed herein for the slice allocation provides guaranteed KPI and optimal usage of network resources and offers several benefits such as, low complexity, easy to develop and hence practically deployable. As application and network parameters are on dissimilar time scales, the method discloses the multi-time scale approach to ensure both network availability and application demands while solving the optimization problem for slice allocation. The method disclosed not only improves throughput and latency, but also brings fairness to the slice allocation in 5G-NR as compared to traditional proportional-fair scheme.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an Application-Specific Integrated Circuit (ASIC), a Field-Programmable Gate Array (FPGA), or a combination of hardware and software means, e.g. an ASIC and an FPGA, or at least one microprocessor and at least one memory with software processing components located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for end-to-end (e2e) slicing in next generation networks, the method comprising:

receiving, via one or more hardware processors of a Next Generation NodeB (gNB), during a current time frame, a demand matrix generated by each User Equipment (UE) among a plurality of UEs currently served by the gNB deployed by a Mobile Network Operator (MNO), wherein the demand matrix represents a plurality of Key Performance Indicators (KPIs) representing a plurality of application parameters and a plurality of network parameters for each service category among a plurality of service categories associated with an application of the UE;

determining, via the one or more hardware processors of the gNB, priority of each UE based on UE type and the one or more service categories received in the demand matrix;

allocating, via the one or more hardware processors of the gNB, number of slices to each UE in accordance with the demand matrix and current resource availability, wherein each UE performs data communication in accordance with the allocated number of slices in a consecutive time frame;

computing for each UE, via the one or more hardware processors of the gNB, a delta matrix based on a difference between the demand matrix, and an observable matrix capturing actual values of the plurality of KPIs experienced by each UE for the consecutive time frame during data communication in accordance with allocated number of slices and one or more service categories of each UE;

generating, via the one or more hardware processors of the gNB, a score matrix representing a UE score of each UE, wherein computing of the UE score comprises:

normalizing a plurality of elements of the delta matrix by weighing the plurality of elements by a plurality of sensitivity weightage parameters; and determining the UE score for each UE as a weighted sum of the normalized plurality of elements of the demand matrix;

deriving, via the one or more hardware processors of the gNB, a penalty matrix as function of the score matrix, and a priority matrix generated by arranging the UE priority of each UE;

determining, via the one or more hardware processors of the gNB, the number of slices to be allocated to each UE by solving a combined optimization problem comprising multi objective functions or a combined optimization with multi-time scale approach, wherein a first objective function based on the penalty matrix allocates optimal number of slices such that the KPIs are maintained, and a second objective function assigns slices to UEs such that achievable data rate of each UE is maximized falling in different time scales, wherein the multi objective functions are defined in terms of (i) the penalty matrix, and (ii) achievable data rate of each UE over a slice and transmit power of UE over the slice; and allocating, via the one or more hardware processors of the gNB, the number of slices to each UE for data communication in a next consecutive time frame, wherein the allocated number of slices are further spilt based on service categories in the demand matrix of each UE, wherein a UE with highest UE score is prioritized for allocation, and wherein the penalty matrix computation and solving of the optimization problem to determine the number of slices repeats for each successive time frame.

2. The processor implemented method of claim 1, wherein the weights of the plurality of sensitivity weightage parameters are predicted by a trained Machine Learning (ML) model, in accordance with a plurality of demand types corresponding to each UE.

3. The processor implemented method of claim 1, wherein the gNB revises the number of slices to be allocated to each UE by implementing predictive slice allocation for UE demands using Machine Learning (ML) model and reserving slices for delay sensitive applications running on the UE.

4. A Next Generation NodeB (gNB) for end-to-end (e2e) slicing in next generation networks, the gNB comprising:

a memory (202) storing instructions;

one or more Input/Output (I/O) interfaces; and one or more hardware processors coupled to the memory via the one or more I/O interfaces, wherein the one or more hardware processors are configured by the instructions to:

receive, during a current time frame, a demand matrix generated by each User Equipment (UE) among a plurality of UEs currently served by the gNB deployed by a Mobile Network Operator (MNO) of the next generation networks, wherein the demand matrix represents a plurality of Key Performance Indicators (KPIs) representing a plurality of application parameters and a plurality of network parameters for each service category among a plurality of service categories associated with an application of the UE;

determine priority of each UE based on UE type and the one or more service categories received in the demand matrix;

allocate number of slices to each UE in accordance with the demand matrix and current resource availability, wherein each UE performs data communication in accordance with the allocated number of slices in a consecutive time frame;

compute for each UE, a delta matrix based on a difference between the demand matrix, and an observable matrix capturing actual values of the plurality of KPIs experienced by each UE for the consecutive time frame during data communication in accordance with allocated number of slices and one or more service categories of each UE;

generate a score matrix representing a UE score of each UE, wherein computing of the UE score comprises:

normalizing a plurality of elements of the delta matrix by weighing the plurality of elements by a plurality of sensitivity weightage parameters; and determining the UE score for each UE as a weighted sum of the normalized plurality of elements of the demand matrix;

derive a penalty matrix as function of the score matrix, and a priority matrix generated by arranging the UE priority of each UE;

determine the number of slices to be allocated to each UE by solving a combined optimization problem comprising multi objective functions or a combined optimization with multi-time scale approach, wherein a first objective function based on the penalty matrix allocates optimal number of slices such that the KPIs are maintained, and a second objective function assigns slices to UEs such that achievable data rate of each UE is maximized falling in different time scales, the multi objective functions are defined in terms of (i) the penalty matrix, and (ii) achievable data rate of each UE over a slice and transmit power of UE over the slice; and allocate the number of slices to each UE for data communication in a next consecutive time frame, wherein the allocated number of slices are further spilt based on service categories in the demand matrix of each UE, wherein a UE having highest UE score is prioritized for allocation, and wherein the penalty matrix computation and solving of the optimization problem to determine the number of slices repeats for each successive time frame.

5. The gNB of claim 4, wherein the weights of the plurality of sensitivity weightage parameters are predicted by a trained Machine Learning (ML) model, in accordance with a plurality of demand types corresponding to each UE.

6. The gNB of claim 4, wherein the one or more hardware processors are configured to revise the number of slices to be allocated to each UE by implementing predictive slice allocation for UE demands using Machine Learning (ML) model and reserving slices for delay sensitive applications running on the UE.

7. One or more non-transitory machine-readable information storage mediums comprising one or more instructions which when executed by one or more hardware processors cause:

receiving by a Next Generation NodeB (gNB), during a current time frame, a demand matrix generated by each User Equipment (UE) among a plurality of UEs currently served by the gNB deployed by a Mobile Network Operator (MNO), wherein the demand matrix represents a plurality of Key Performance Indicators (KPIs) representing a plurality of application parameters and a plurality of network parameters for each service category among a plurality of service categories associated with an application of the UE;

determining by the gNB, priority of each UE based on UE type and the one or more service categories received in the demand matrix;

allocating by the gNB, number of slices to each UE in accordance with the demand matrix and current resource availability, wherein each UE performs data communication in accordance with the allocated number of slices in a consecutive time frame;

computing for each UE, by the gNB, a delta matrix based on a difference between the demand matrix, and an observable matrix capturing actual values of the plurality of KPIs experienced by each UE for the consecutive time frame during data communication in accordance with allocated number of slices and one or more service categories of each UE;

generating by the gNB, a score matrix representing a UE score of each UE, wherein computing of the UE score comprises:

normalizing a plurality of elements of the delta matrix by weighing the plurality of elements by a plurality of sensitivity weightage parameters; and determining the UE score for each UE as a weighted sum of the normalized plurality of elements of the demand matrix;

deriving by the gNB, a penalty matrix as function of the score matrix, and a priority matrix generated by arranging the UE priority of each UE;

determining by the gNB, the number of slices to be allocated to each UE by solving a combined optimization problem comprising multi objective functions or a combined optimization with multi-time scale approach, wherein a first objective function based on the penalty matrix allocates optimal number of slices such that the KPIs are maintained, and a second objective function assigns slices to UEs such that achievable data rate of each UE is maximized falling in different time scales, wherein the multi objective functions are defined in terms of (i) the penalty matrix, and (ii) achievable data rate of each UE over a slice and transmit power of UE over the slice; and allocating by the gNB, the number of slices to each UE for data communication in a next consecutive time frame, wherein the allocated number of slices are further spilt based on service categories in the demand matrix of each UE, wherein a UE with highest UE score is prioritized for allocation, and wherein the penalty matrix computation and solving of the optimization problem to determine the number of slices repeats for each successive time frame.

8. The one or more non-transitory machine-readable information storage mediums of claim 7, wherein the weights of the plurality of sensitivity weightage parameters are predicted by a trained Machine Learning (ML) model, in accordance with a plurality of demand types corresponding to each UE.

9. The one or more non-transitory machine-readable information storage mediums of claim 7, wherein the gNB revises the number of slices to be allocated to each UE by implementing predictive slice allocation for UE demands using Machine Learning (ML) model and reserving slices for delay sensitive applications running on the UE.

* * * * *